Feb. 20, 1934.  J. DE LA CIERVA  1,948,458
AIRCRAFT SUSTAINING ROTOR
Original Filed Dec. 4, 1930   3 Sheets-Sheet 1
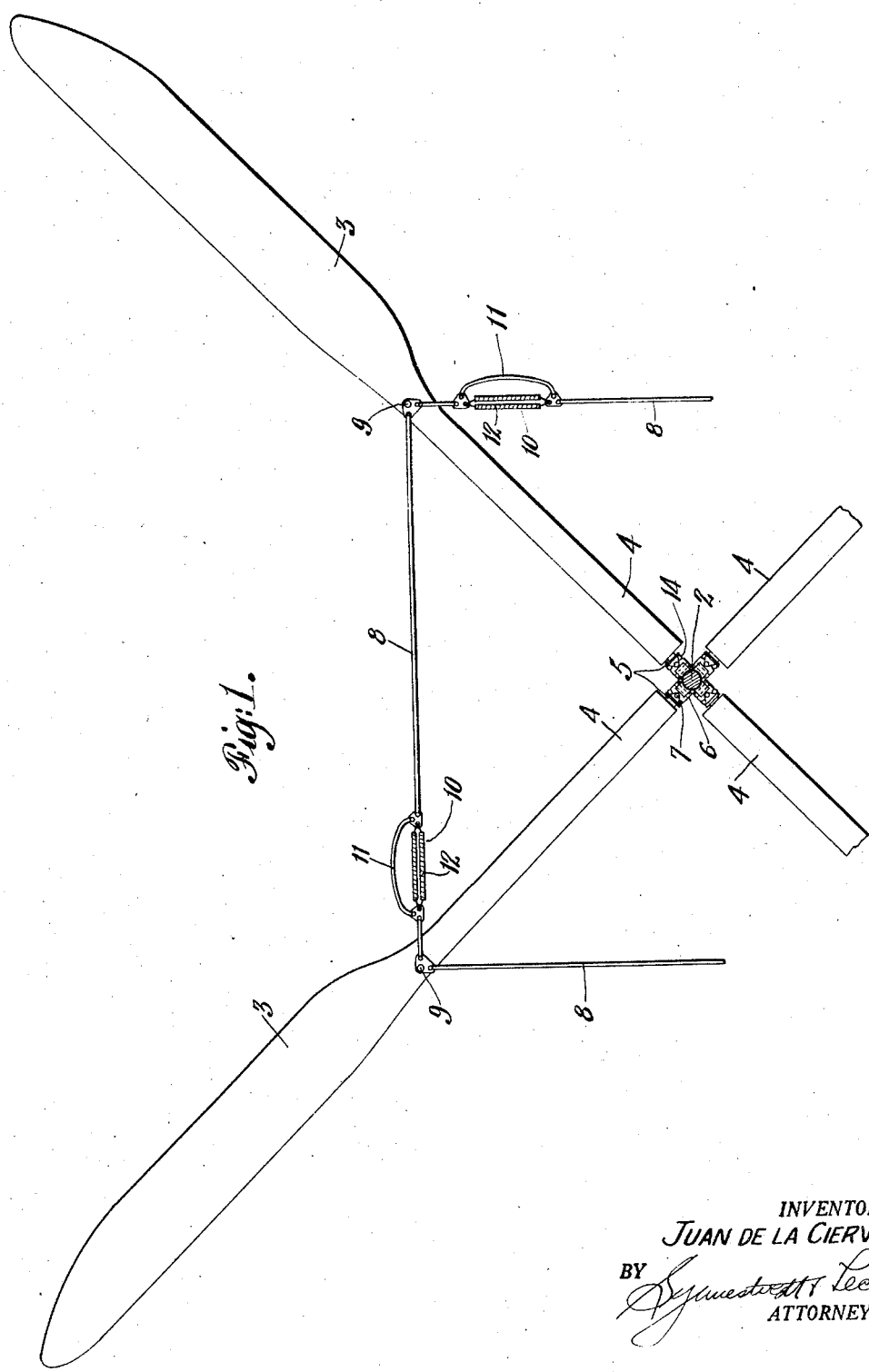
INVENTOR.
JUAN DE LA CIERVA
BY
ATTORNEYS.

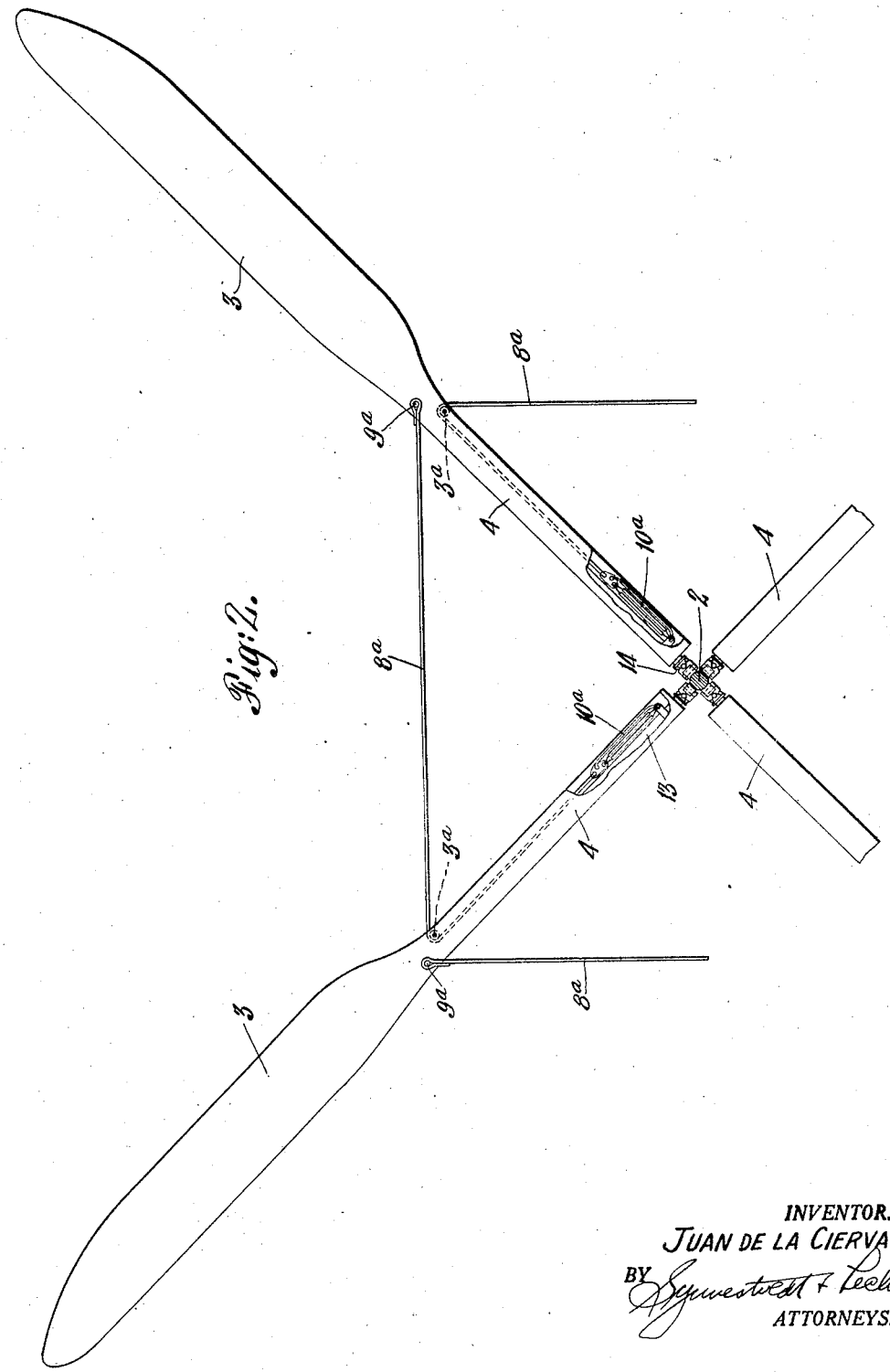

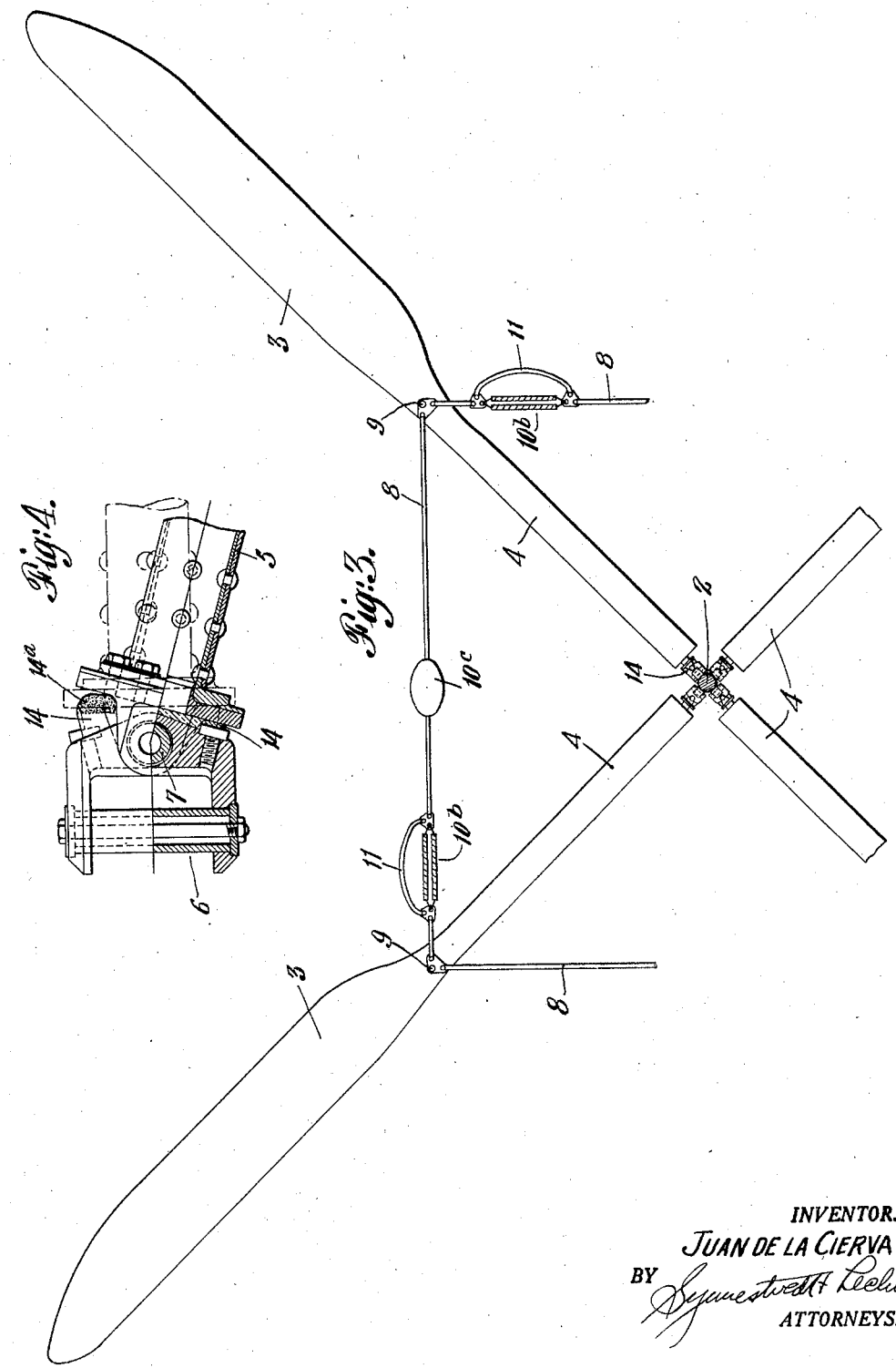

Patented Feb. 20, 1934

1,948,458

UNITED STATES PATENT OFFICE 1,948,458

AIRCRAFT SUSTAINING ROTOR

Juan de la Cierva, Madrid, Spain, assignor to Autogiro Company of America, Philadelphia, Pa., a corporation of Delaware Application December 4, 1930, Serial No. 500,063
Renewed July 30, 1932

5 Claims. (Cl. 244—19)

This invention relates to aircraft sustaining rotors, and more particularly to rotor construction of the pivoted-wing type, adapted to be actuated by relative air flow for the sustension of an aerial device or aircraft. An understanding of the present invention can best be obtained by considering first certain aspects of the construction and operation of auto-rotative-winged aircraft.

Aircraft of such rotative-winged type, disclosed first in my Patent, No. 1,590,497, issued June 29, 1926, are, for added smoothness of rotor operation, reduction of stresses and more complete yielding to drag and anti-drag forces, now usually equipped, in addition to the horizontal transverse pivots shown in said patent, with means for permitting blade or wing displacement or flexure forwardly and rearwardly of the radial blade position, two examples of such means being illustrated in my co-pending application, Serial No. 145,655, filed November 1, 1926, issued May 24, 1932 as Patent No. 1,859,584.

The present preferred way of obtaining such blade displacement is to provide each individual blade of the rotor with a pivot additional to its transverse pivot, the axis of which is fixed in a substantially vertical position. In flight, inertia forces tend to hold the blades in substantially radial position, with, however, some fore-and-aft, as well as substantial up-and-down movements of each blade, independently, during each revolution of the rotor. When the action of inertia forces is low, however, as when the rotor is being initially started or when it is coming to rest, and also at times when excessive blade movements might possibly take place in flight, it is desirable that some restraint or control be applied thereto, and to this end I have heretofore applied various flexible means of blade interconnection, as exemplified, for instance, in the aforementioned application and in my co-pending application, Serial No. 498,298, filed November 26, 1930, issued October 25th, 1932 as Patent No. 1,884,597.

Under certain flight conditions it has been found that the application of such flexible or resilient connections between blades apparently has produced roughness of operation at certain rotor speeds, presumably due to the setting up or magnifying of synchronized vibrations or oscillations of the blades, either synchronous as between the articulative movements of two or more blades or synchronous as between the articulative movement of a blade and the rate of rotation of the rotor.

The present invention has as its primary object the reduction or elimination of such difficulties, particularly the obviation of synchronous vibrations, and in general the obtaining of smooth rotor action, while retaining the advantages of relatively free and unrestricted articulative movements of the blades in flight, proper positioning and control of the blades when at rest or when stopping, and a substantial rigidity of the blade system during initiation of rotation, which latter is of especial advantage when starting up the rotor by directing air currents against the blades, as referred to at greater length in my copending application, Serial No. 496,872, filed November 20, 1930.

More specifically, my invention involves the provision of resiliently yielding controlling, and/or cushioning, means, the present preferred form of which is a blade interconnection device, in which the resilient cushioning or controlling element itself is inherently of such tension or compression characteristics as will tend to damp out, rather than build up, unwanted vibrations, i. e. which in conjunction with the blade will provide only for inherent vibration periods of oscillation such that the frequencies and major harmonics thereof, are out of resonance with flight speeds of rotation. I preferably accomplish this by the use of a device constructed and arranged to produce a substantially uniform increase in tension (or resistance) for a given increase in elongation or compression of the cushioning device as blade displacement increases. In other words, I contemplate the provision of an elastic element arranged to provide a resistance of constantly (rather than variably) increasing value per unit of elongation or compression during operation.

I further contemplate the use of such a device either separately or in conjunction with other blade controlling devices.

How the foregoing objects and advantages together with others which will occur to those skilled in the art, are attained by my invention, will be clear from the following description, reference being had to the accompanying drawings, in which:

Figure 1 is a fragmentary plan view of a rotor construction embodying the present invention, with a part shown in section;

Figure 2 is a similar view, with a part of the blade or wing covering broken away, illustrating a modification of the invention;

Figure 3 is a similar view of still another modification; and

Figure 4 is an enlarged view, half in plan and half in section, of a form of articulative blade mounting preferably employed in the rotors of Figures 1 to 3.

In Figure 1 is shown, in section, a substantially vertically disposed and freely rotatably-mounted common shaft or axis member 2 which is to be mounted above the body or fuselage (not shown) of an aircraft. Each blade or wing 3, the covering 4 of which extends inward almost to the inner or hub end of the blade spar 5, is arranged, in addition to rotative movement around axis 2, for vertical displacement to compensate for differences in inertia and lift forces and for horizontal fore-and-aft displacement (in the general path of rotation) to compensate for differences in drag and anti-drag forces, such arrangements preferably comprising a transverse horizontal pivot axis 6 and a substantially vertical pivot axis 7, respectively.

For controlling and/or cushioning blade movements on either side of radial position I provide cables 8 interconnecting the blades at points of attachment 9, and in each cord or cable 8 I insert a resilient element or elements 10, which may be jumped by a slack section of safety cable 11. During flight, the blades 3 normally "cone" upwardly about pivots 6 (in varying degrees at different points of the circle of rotation when moving forwardly, but in uniform degrees at all points in said circle during vertical descent) to such extent that the distance between adjacent points 9 is lessened to a point where elements 10 are under comparatively little tension other than that exerted when an extreme blade movement on pivot 7 takes place. But with the blades in slow rotation, as in starting and stopping, and when at rest, they more nearly approach a perpendicular to the axis of rotation, i. e. the system of blades lies more nearly in a flat plane. The effectiveness of elements 10 is thus increased under the latter conditions, which is desirable.

Under any conditions, however, in which the elements 10 act to any degree, including those occasions when individual blade displacements in flight tend to be excessive (as by gusts of wind, for example) the present construction is so arranged that the resilient action of said elements does not build up periodic vibrations. This is accomplished by providing, as hereinbefore indicated, a form of resilient device which is inherently built so that any vibrations it may set up in conjunction with the blades, or major harmonics thereof, will be different from normal frequencies of rotation in flight. I have found that the usual resilient device, such as a section of elastic material inserted in the interblade cable, is not suited to obtaining the said desired inherent characteristics, because of the fact that it has an initial resistance to elongation, that is, a tension, out of all proportion to its resistance after it has been stretched out to some extent. In other words, its resistance does not increase uniformly per linear unit of stretch imposed upon it. This appears to make it impossible to avoid a range of inherent vibration periods in the blades at some point of which a resonant vibration will be set up.

One way of obtaining the desired characteristic is to provide an elastic element which, right from the initiation of stretch up to the limits of stretch imposed in actual service, gives a substantially uniformly increasing resistance per linear unit of stretch, which appears to avoid resonance between blades, or resonance of a blade with respect to flight speeds of rotation of the rotor. It is conceivable that yielding devices of other characteristics might be employed, so long as such characteristics fall within the purpose hereinbefore stated, which is, that the nature of the device, from the standpoint of resilience, be such as to avoid resonant vibrations. However, one which gives a substantially uniform change in resistance, I have found to be satisfactory, as well as a very simple embodiment of the invention.

This uniform change may be obtained in various ways, as, for example: by utilizing a spring device inherently constructed to avoid a relatively excess resistance at initiation of tension or compression, or, an ordinary spring or other yielding device of the usual irregular characteristics connected up through variably-acting levers or the like. In some instances, the blade period might be such as to require, instead of evenly acting devices, a resilient element of greater stiffness, and acting in all ranges of rotational speed, so as to bring its period above any rate of rotation in flight, and this may be obtained by providing an elastic or yieldable element of ordinary characteristics, and, first placing it under tension, winding it spirally with cord or elastic 12 (Fig. 1).

In Fig. 2, I employ similar elements 10a, but in this construction I mount the device inside the blade covering 4 and run cable 8a around a pulley or wheel 3a and extend it to a point of attachment 9a on the adjacent blade. The inner end of element 10a may be readily secured to blade spar 13. In this way parasite resistance is reduced to a minimum, and the weight of the yielding device itself is brought in nearer to the hub where its centrifugal action on the rotor becomes negligible.

In the construction of Fig. 3, there is combined with the element 10b a centrifugal weight 10c which may be utilized to place a given element 10b under greater tension at all speeds of rotation, which will alter the oscillation period of the blade and place it in a different range. This may be desirable in cases where such change in range is necessary to insure avoidance of resonance.

In addition to the use of any of said forms of control, I contemplate also, where a smaller range of degrees of blade movement is desirable, the use of compression controls, such as shown in Figs. 1, 2 and 3, and shown in enlarged detail at 14 in Fig. 4, which controls are preferably mounted adjacent the blade articulation, as shown.

While I do not claim compression controls, per se, as they are shown and claimed in my co-pending application, Serial No. 496,872, filed November 20, 1930, I do claim them in conjunction with the tension device of the instant case, and also as specifically formed here, in which they are capped with a yielding material 14a of different resistive characteristics, the part 14a preferably being softer than the part 14.

When formed as just indicated they may be utilized to the possible exclusion of blade interconnections. Or they may be utilized in conjunction with one or more of the devices 10, 10a, 10b and 10c, to augment the control, or to limit the degrees of articulative angling, of the blades.

I claim:—

1. In an aircraft sustaining rotor, a blade mounted for rotation about a substantially vertical axis, and having means permitting blade displacement for substantial equilibration between various forces during rotation, and control means elastically resistive to blade displacement, said control means including an elastic device having a rate of increase of resistance after initial distortion at least as low as the rate of increase in the initial zone, said control means being positioned to act adjacent the axis end of the blade to reduce parasite drag.

2. In an aircraft sustaining rotor, a blade mounted for rotation about a substantially vertical axis, and having means permitting blade displacement for substantial equilibration between various forces during rotation, and control means elastically resistive to blade displacement, said control means being of such characteristics that blade displacement movements in conjunction with said elastic means are of normal periods of oscillation different from rates of rotation at least in flight, said control means further comprising a plurality of control devices, one of which operates on the blade adjacent the axis, and one at a distance therefrom.

3. In a rotary wing system for aircraft, an upright rotatable axis mechanism, wing means mounted thereon for normal actuation by relative air-flow, means providing for oscillation of the wing means under the action of flight forces, and means for controlling wing oscillations set up by relative air-flow and other forces in flight, said control means being mounted in large part within the wing means adjacent the axis thereof whereby interference with normal air-actuation of the wing means is minimized.

4. In a rotary wing system for aircraft, an upright rotatable axis mechanism, wing means mounted thereon for normal actuation by relative air-flow, means providing for oscillation of the wing means under the action of flight forces, means located adjacent the axis and positioned to definitely limit the wing oscillations within a given restricted zone, and means tending to maintain a given relation between the inherent wing-oscillation period and the normal rotational period of the system in flight.

5. In a rotary wing system for aircraft, a common rotatable hub structure for a plurality of wings, a plurality of wings mounted thereon in position to be aerodynamically rotated by relative air-flow in flight, means for mounting said wings on said hub structure providing for swinging or oscillative movements of the wings to compensate for varying forces in flight, and means for controlling the said movements including yieldingly resistive means located adjacent the hub and comprising a plurality of cushioning devices of respectively different resistance values.

JUAN DE LA CIERVA.